United States Patent [19]

Pizzuti

[11] 4,392,732
[45] Jul. 12, 1983

[54] FOLDING CAMERA WITH VIEWFINDER HAVING INDEPENDENTLY MOUNTED OPTICAL ELEMENTS

[75] Inventor: Donato F. Pizzuti, Lynnfield, Mass.
[73] Assignee: Polaroid Corporation, Cambridge, Mass.
[21] Appl. No.: 334,980
[22] Filed: Dec. 28, 1981
[51] Int. Cl.³ .................... G03B 17/04; G03B 13/02
[52] U.S. Cl. .................................. 354/187; 354/219
[58] Field of Search ............... 354/158, 187, 192, 193, 354/194, 219

[56] References Cited

U.S. PATENT DOCUMENTS

| | | |
|---|---|---|
| 3,415,644 | 12/1968 | Land . |
| 3,479,941 | 11/1969 | Erlichman ............................ 354/187 |
| 3,589,253 | 6/1971 | Erlichman ............................ 354/187 |
| 3,594,165 | 7/1971 | Rogers . |
| 3,610,123 | 10/1971 | Bellows ............................... 354/219 |
| 3,683,770 | 8/1972 | Land .................................... 354/187 |
| 3,722,389 | 3/1973 | Costa et al. ......................... 354/187 |
| 3,761,268 | 9/1973 | Land et al. . |
| 3,877,046 | 4/1975 | Sorimachi et al. .................. 354/187 |
| 3,971,052 | 7/1976 | Plummer ............................. 354/219 |
| 4,016,579 | 4/1977 | Lewis .................................. 354/219 |
| 4,016,580 | 4/1977 | Finelli ................................. 354/219 |
| 4,166,683 | 9/1979 | Yazaki ................................. 354/192 |

FOREIGN PATENT DOCUMENTS 694711 7/1953 United Kingdom ................ 354/187

Primary Examiner—Alan Mathews
Attorney, Agent, or Firm—John S. Vale

[57] ABSTRACT

A compact folding camera having a mirror in its exposure optical path includes a self-erecting and folding viewfinder. Major camera components include a base housing section having a film plane therein, a pivoting lens housing near one end of the film plane mounting an objective lens and front viewfinder lens, a pivoting mirror assembly near the opposite end of the film plane, a foldable bellows, a cover section, and a rear viewfinder lens mounted on the trailing end of the base section for movement between erected and storage positions. When the camera is erected, the rear lens assumes its upstanding erected position in optical alignment with the front lens for forming a direct viewing viewfinder. As the camera is folded, the lens housing folds back down over the base section so as to overlie the film plane and movement of the cover section toward its storage position overlying the base section causes viewfinder erecting structure to pivot the rear viewfinder downwardly to its storage position.

7 Claims, 7 Drawing Figures

FIG. I

FOLDING CAMERA WITH VIEWFINDER HAVING INDEPENDENTLY MOUNTED OPTICAL ELEMENTS

CROSS-REFERENCE TO RELATED APPLICATIONS

Certain aspects of the camera disclosed herein are disclosed and claimed in commonly-assigned copending applications U.S. Ser. Nos. 334,979, 334,981, and 334,982 filed on even date herewith.

BACKGROUND OF THE INVENTION

The present invention relates to the field of photography and, more particularly, to folding cameras having a mirror in the exposure optical path and also including a self-erecting and folding viewfinder for viewing and framing the scene to be photographed.

Integral self-developing film units of the general type disclosed in commonly-assigned U.S. Pat. Nos. 3,415,664; 3,594,165 and 3,761,268 and marketed by Polaroid Corporation, Cambridge, Mass., under the tradename SX-70, Time Zero and 600 High Speed Land film, are exposed and viewed through the same side of the film unit thereby requiring an odd number of image reversals in the exposure optical path for correct image orientation.

Most commonly, cameras designed for this type of film include a horizontal base section for supporting a film pack with the forwardmost film unit therein located at the camera's film or exposure plane; an upstanding lens and shutter housing located at the forward end of the base section and mounting an objective lens with its optical axis generally parallel, or at some other non-perpendicular angle, to the film plane; and a mirror mounted at the opposite end of the base section with its forwardly directed reflective surface inclined at an appropriate angle with respect to the film plane and lens axis to reflect image forming light from the lens down onto the film unit for exposure. The mirror thus provides the necessary additional image reversal and also allows the relatively long optical path required for focusing an image on a snapshot sized film unit to be folded thereby making the camera more compact in its exposure configuration.

Representative examples of folding cameras of this general type having a variety of different folding viewfinders or viewfinder assemblies may be found in U.S. Pat. Nos. 3,479,941; 3,589,253; 3,683,770; 3,722,389; 3,877,046 and 4,166,683.

Typically, these cameras include a base section, a lens and shutter housing pivotally coupled to one end of the base section, a cover section supporting the mirror, pivotally coupled to the opposite end of the base section, and a folding bellows disposed therebetween. When the camera is erected, the lens and shutter housing is located in upstanding relation to the forward end of the base section and the cover station is inclined upwardly to set the mirror at the proper angle with respect to the lens axis and the film plane in the base section. The bellows is erected between the housing sections to block ambient light from the exposure optical path.

As the camera is folded, the lens and shutter housing pivots forwardly and downwardly in front of the forward end of the base housing section to assume its storage position in substantially coplanar end-to-end relation therewith and the cover section folds down into overlying relation with the base section. The bellows folds into a flat configuration and is stored therebetween.

A common basic design feature in the folding schemes employed in all of the cameras disclosed in the above-noted patents is that the two largest (by volume) housing sections—the base housing section for receiving the film pack and the lens and shutter housing—are arranged in longitudinally extending, generally coplanar end-to-end relation when the camera is in its folded position. This maximizes the length of the folded camera in the interest of minimizing its height or thickness dimension.

The relative folded storage positions of these two major housing sections determines the overall philosophy of the camera folding scheme into which the other components—cover housing section, mirror, bellows and viewfinder—must be integrated in a compatible manner.

The above-noted prior art cameras employ a variety of different types of viewfinders or viewfinder assemblies which are integrated into the folding scheme in a manner that is compatible with the end-to-end placement of the base section and lens end shutter housing.

For example, the cameras disclosed in U.S. Pat. Nos. 3,479,941 and 3,683,770 have a unified elongated direct viewfinder built into the side of the cover housing section for movement therewith between the erected and storage positions. The term "unified viewfinder" means that all of the viewfinder optical elements are mounted on a common structure and move as a unit, while remaining in optical alignment, when the camera is folded and erected.

The camera disclosed in U.S. Pat. No. 3,589,253 mounts a unified viewfinder on an elongated movable erecting link and includes a recess provided at the trailing end of the cover section for receiving the viewfinder therein when the camera is folded. In U.S. Pat. No. 3,877,046, the unified viewfinder is mounted on and moves with the lens and shutter housing.

Other cameras of this type are provided with a divided viewfinder assembly wherein front and rear optical elements, or groups of elements, are mounted on different camera components for independent movement between a folded storage position where the elements are not in functioning optical alignment and an operative erected position wherein the elements are in optical alignment to form the viewfinder.

For example, the camera disclosed in U.S. Pat. No. 3,722,389 employs a single lens reflex viewing system wherein light trasmitted through the objective lens is reflected from a mirror onto a viewing and focusing screen and then to a viewfinder assembly comprising an asymmetric mirror and rear eyelens. The objective lens is mounted on the lens and shutter housing, the mirror is mounted on the cover housing section, the focusing screen is located in the base section over the film plane and the viewing assembly is mounted on a short cover section. The viewing assembly comprising the asymmetric mirror and rear lens is not completely self-erecting in that its overlying cover must be manually unlatched by the camera operator in preparation for erecting the camera and also must be manually folded and latched as the final step in locating the interconnected housing sections in the folded storage position. In U.S. Pat. No. 4,166,683, a front group of viewfinder lens elements are mounted on the lens and shutter housing to one side of the objective lens and a group of rear lens elements are aligned in a tubular structure that is pivotally mounted on the cover section. When the camera is erected, the front and rear groups are in optical alignment to form a direct viewing viewfinder. When the camera is folded, the forward group of lens elements rotates downwardly with the lens and shutter housing into its end-to-end relationship with the base section and the tube mounting the rear elements pivots into a storage position located between the base section and the closed cover section.

Obviously, for such a divided viewfinder to function effectively there must be good optical alignment between the front and rear optical elements or groups of elements when the camera is in its operative erected position.

The present invention relates to a folding camera that includes a mirror in the exposure optical path for providing correct image orientation in the final print but employs a folding scheme that differs from those described above in that the lens and shutter housing is configured to fold back over the base housing section to assume a folded storage position overlying the film plane. Thus, the two major housing sections are arranged in stacked, rather than in end-to-end, relationship to minimize the length of the folded camera while making it somewhat thicker.

Therefore, it is an object of the present invention to provide such a folding camera wherein the lens housing is folded back over the base section for storage and the other major components of the camera, including a self-erecting and folding viewfinder, are integrated therewith in a manner that is compatible with this folding scheme.

Another object is to provide such a camera that is simply constructed and easy to use.

Yet another object is to provide such a camera wherein the viewfinder is of the divide type and is structured to facilitate good optical alignment of the individual viewfinder optical elements when the camera is in its operative erected position.

Other objects of the invention will, in part, be obvious and will, in part, appear hereinafter.

SUMMARY OF THE INVENTION

The present invention provides a folding camera including a self-erecting and folding viewfinder. Major camera components include a base housing section; a lens housing section mounting an objective lens and a front viewfinder lens forming part of a viewfinder for viewing and framing a scene in the field of view of the objective lens; a mirror assembly; a foldable bellows; a cover housing section; first and second erecting means interconnecting the lens and cover housing sections and the mirror assembly for coordinated movement; a rear viewfinder lens pivotally mounted on the base section; and third erecting means responsive to movement of the cover section for effecting movement of the rear viewfinder lens between erected and storage positions.

The base housing section includes means for supporting a film unit at a film plane located between leading and trailing ends of the base section. The lens housing is pivotally coupled to the base housing section, adjacent an end of the film plane closest to the leading end, for movement between an upstanding operative erected position and a folded storage position wherein the lens housing is folded back over the base housing section so that at least a portion thereof overlies the film plane.

The mirror assembly includes a mirror and means for pivotally coupling the mirror to the base housing section, adjacent an opposite end of the film plane closest to the trailing end of the base housing section, for movement between an operative erected position wherein a reflective surface of the mirror is set to reflect image forming light rays transmitted by the lens onto the film plane to expose a film unit thereat and an inoperative folded storage position wherein at least a portion of the mirror overlies the film plane and is located between the film plane and a portion of the lens housing located in a storage position.

The bellows is attached to the base and lens housing sections and also the mirror assembly for movement, in response to movement of the lens housing section and mirror assembly, between a light blocking erected position and a folded storage position wherein it assumes a substantially flat configuration with a portion thereof overlying the film plane and being located between the mirror and lens housing sections located in their respective storage positions. The cover section is pivotally coupled to the base housing section adjacent the trailing end thereof for movement between an erected position wherein it provides clearance for erecting the lens housing section, mirror assembly and bellows and a folded storage position where it overlies the base section in covering relation to the lens housing section, mirror assembly and bellows. The cover section is provided with an aperture therein that is optically aligned with the front viewfinder lens when the camera is erected.

The first erecting means interconnects the lens and cover housing sections for coordinated movement between their respective erected and storage positions. The second erecting means interconnects the lens housing and the mirror assembly for coordinated movement between their respective erected and folded positions.

The rear viewfinder lens is pivotally mounted on the base housing section for movement between an upstanding operative erected position wherein it is optically aligned with the front lens and the aperture in the cover housing section and cooperates with the front lens to form the viewfinder having a viewing optical path that extends through the aperture and a folded storage position wherein the rear viewfinder lens is folded down in overlying relation to the base housing section. Advantageously, the lens housing mounting the front viewfinder lens and the rear viewfinder lens are both mounted on a common structural element, namely the base section, so as to facilitate their optical alignment and reduce assembly and calibration costs.

The third erecting means is responsive to movement of the cover section from its storage position to its erected position for automatically effecting movement of the rear viewfinder lens from its storage position to its erected position and is also responsive to movement of the cover housing section from its erected position to its storage position for automatically effecting movement of the rear viewfinder lens from its erected position to its storage position.

In a preferred embodiment, the third erecting means includes a lever that is pivotally coupled to the cover housing section and is connected in driving relation to the rear lens for moving it between its erected and storage positions in response to pivotal motion of the lever.

In the illustrated embodiment, the lever interacts with the lens housing section located in its folded storage position to effect its pivotal motion to fold the rear viewfinder lens. Preferably, the lever serves as a rear viewfinder lens cover that shades a portion of the viewfinder optical path when the camera is erected and protectively covers the folded rear viewfinder lens when the camera is in its folded storage position.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
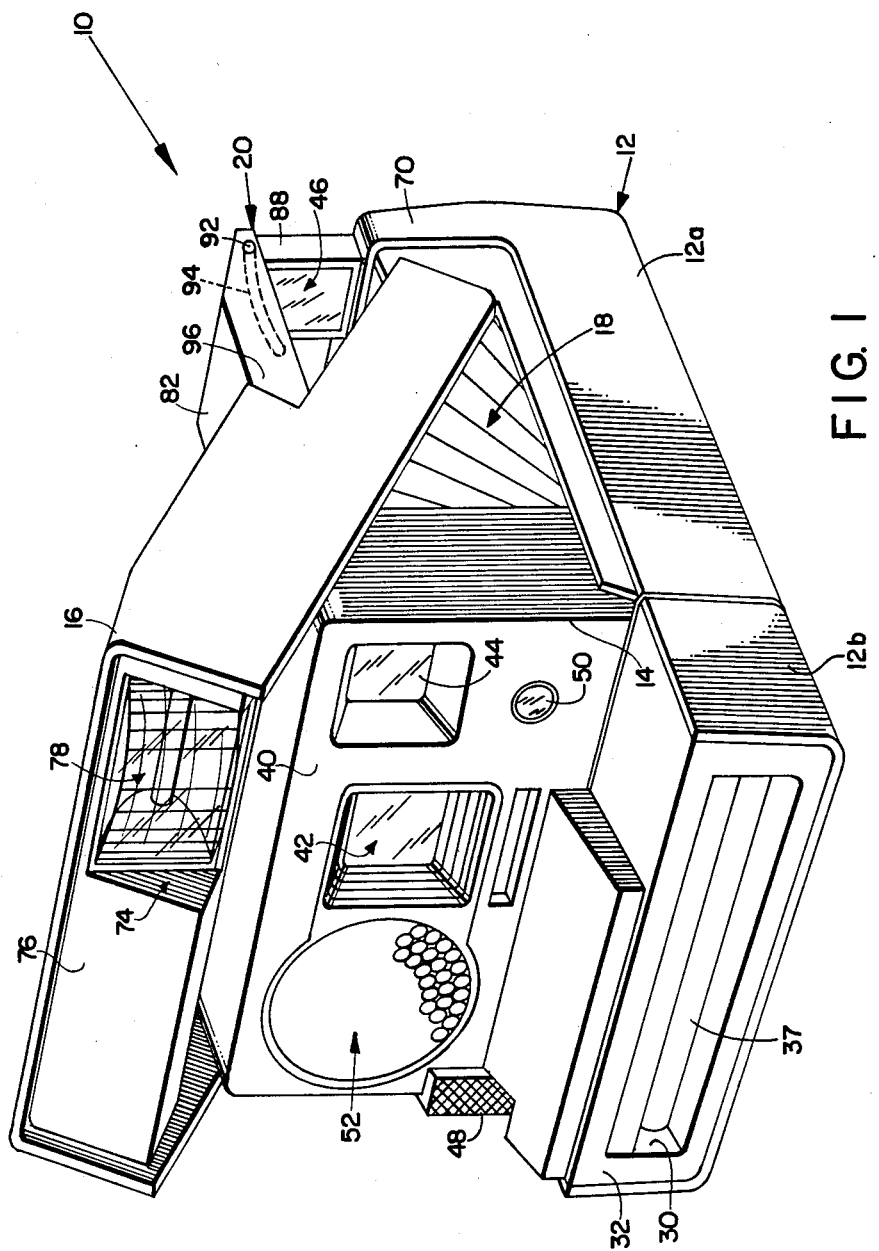
FIG. 1 is a front perspective view of the folding camera embodying the present invention shown in its erected operative configuration.
Figure 2:
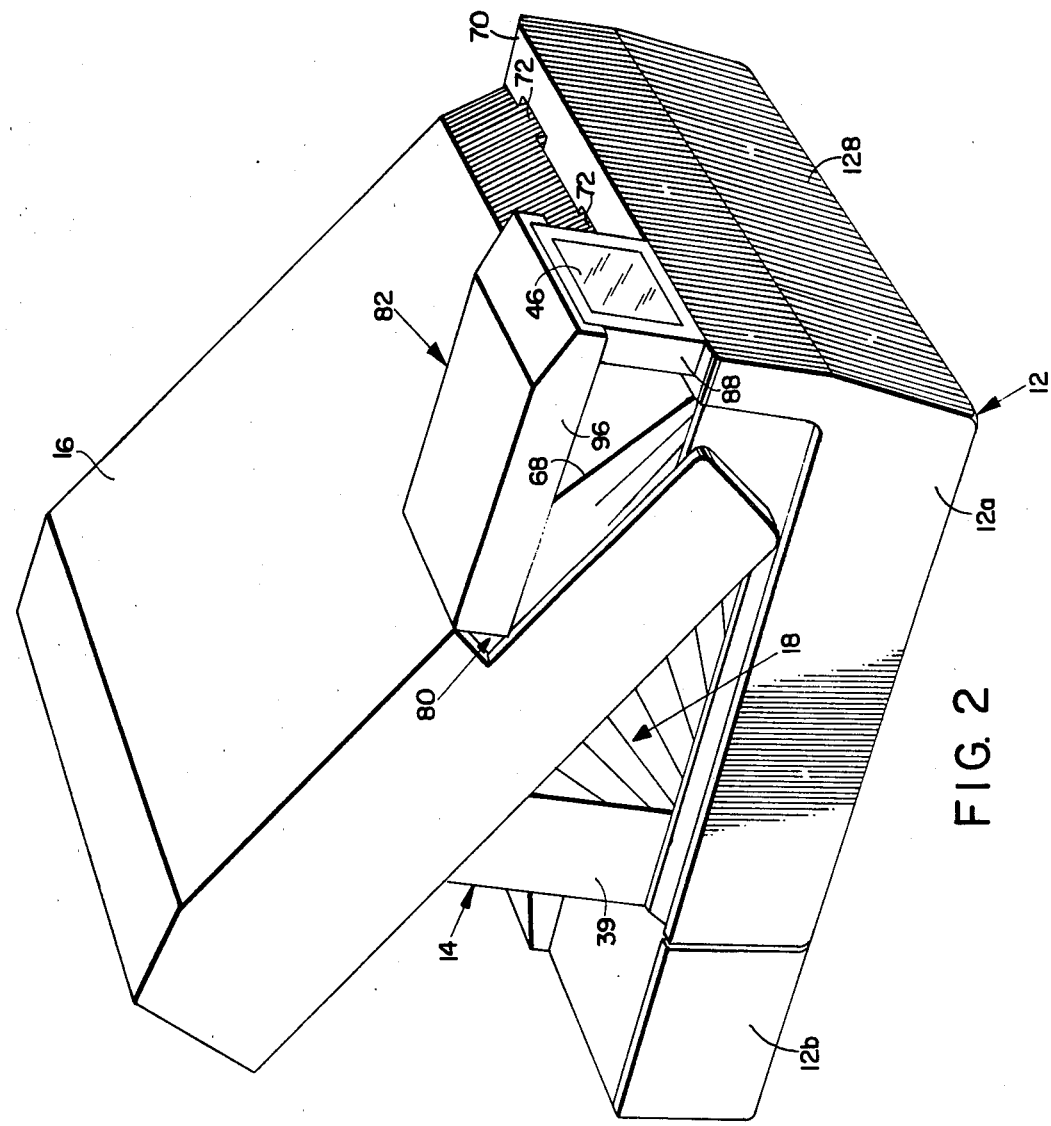
FIG. 2 is a rear perspective view of the erected camera of FIG. 1.
Figure 3:
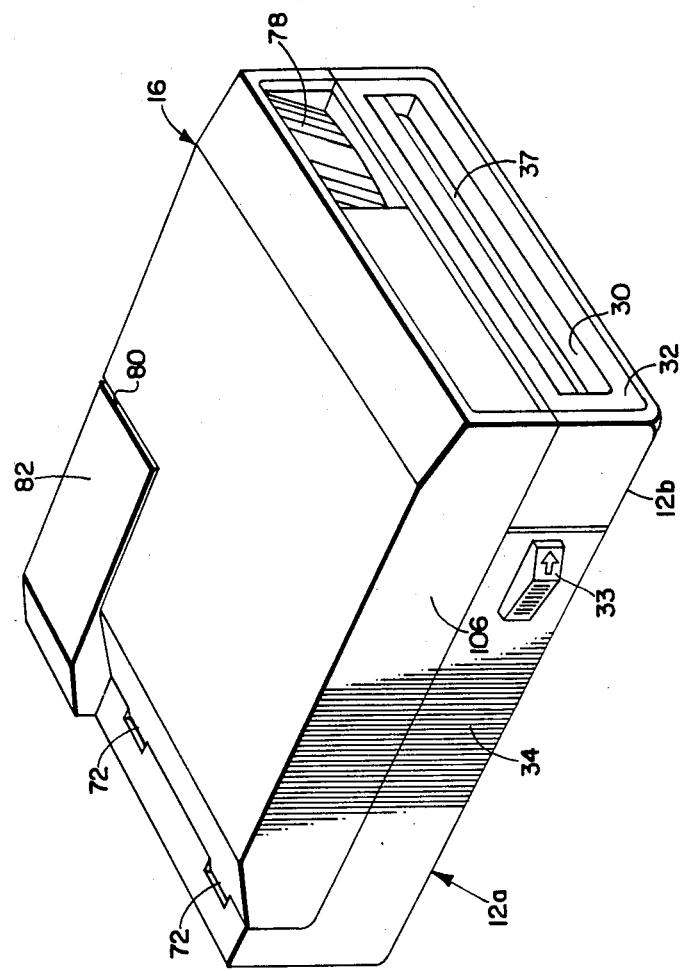
FIG. 3 is a perspective view of the camera embodying the present invention shown in its folded storage position.
Figure 4:
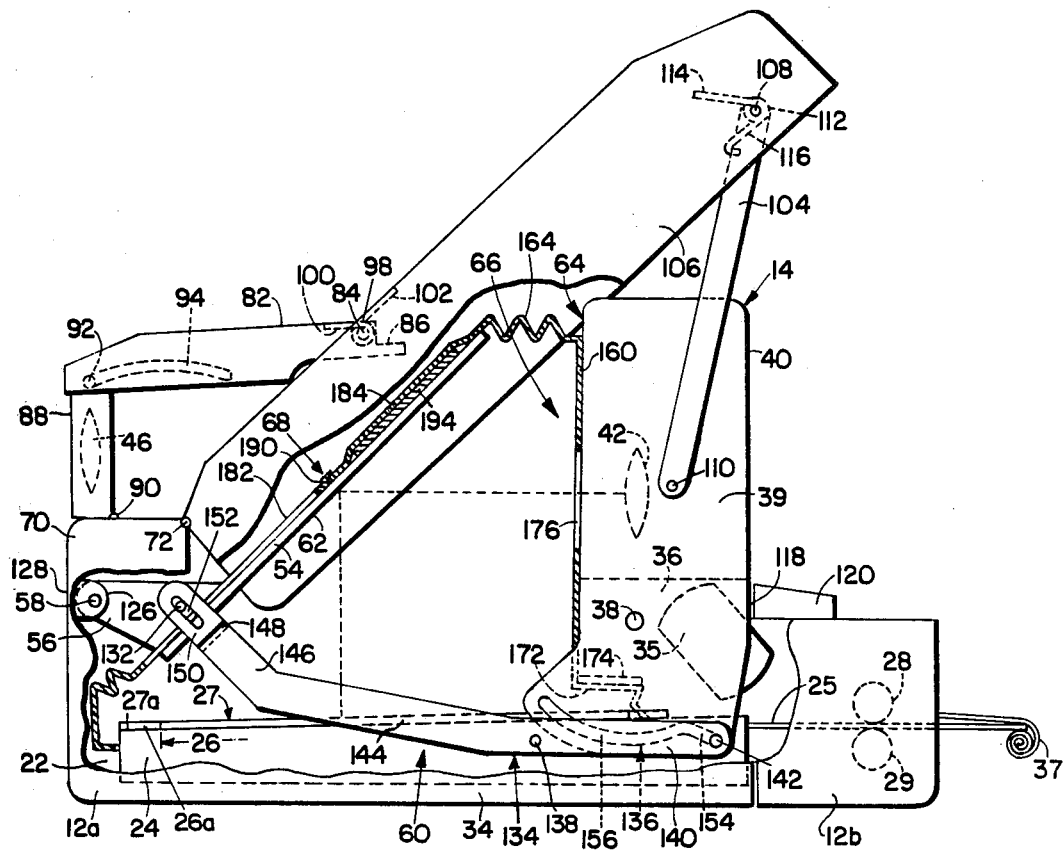
FIG. 4 is a right-side elevational view, partly cut away, to show various components of the erected camera.
Figure 5:
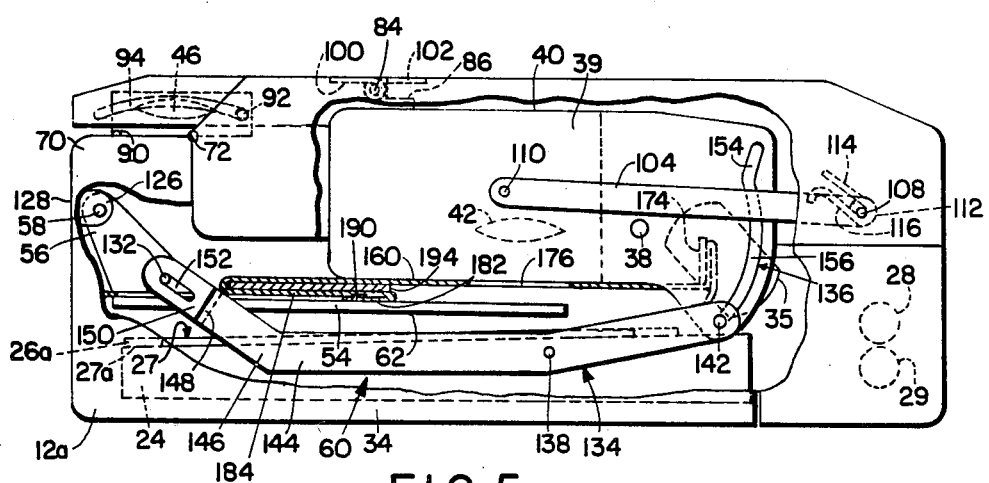
FIG. 5 is a right-side elevational view, partly cut away, showing the components of FIG. 4 in their folded storage positions.

A compact folding camera 10 embodying the present invention is shown in its operative erected position in FIGS. 1, 2 and 4, and in its inoperative folded storage position in FIGS. 3 and 5.

The major structural components of camera 10 include a plurality of interconnected housing sections 12, 14 and 16, a folding light opaque bellows 18, and a folding rear viewfinder lens assembly 20.

In the illustrated embodiment, camera 10 is of the self-developing type for exposing and processing integral self-developing snapshot size film units which are exposed and viewed through the front side thereof and therefore require one, or an odd number of, additional image reversals in the exposure optical path for correct image orientation in the final positive print. Representative examples of such self-developing film units are disclosed in commonly-assigned U.S. Pat. Nos. 3,415,664; 3,594,165; and 3,761,268. These film units generally are supplied in a cassette or film container which also includes a flat battery underlying the stack of film units for powering the camera's electrical system. For representative examples of such cassettes, see commonly-assigned U.S. Pat. Nos. 3,779,770 and 3,948,662.

Section 12 is a base housing section comprising a rear portion 12a having means for defining an open-ended chamber 22 therein for receiving and supporting a film cassette 24 so that a forwardmost one of the film units 25 therein (see FIG. 4) is located at the camera's film or exposure plane 26 underlying a rectangular exposure aperture 27 in the top wall 27a of cassette 24; and a forward portion 12b coupled to the leading end of portion 12a for pivotal motion relative thereto between its closed operativeposition (shown) wherein it supports a pair of laterally extending pressure applying rollers 28 and 29 between a film withdrawal slot at the leading end of cassette 24 and a film exit opening 30 in a leading end wall 32 of portion 12b (see FIG. 1); and an inoperative open position (not shown) wherein portion 12b is pivoted downwardly, in a clockwise direction (as viewed in FIG. 4), to provide access to an open leading end of portion 12a through which a film cassette 24 is moved to insert it into or withdraw it from receiving chamber 22. Portion 12b is releasably held in its closed position by a latch mechanism (not shown) which is released by manually actuating a latch release button 33 slidably mounted on the right side wall 34 of portion 12a as shown in FIG. 3.

The means for locating the forwardmost film unit 25 in cassette 24 at the film plane 26 in position for exposure includes a horizontal plate 26a forming the top wall of chamber 22 and having a central aperture therein through which an upstanding rib about the exposure aperture 27 in cassette 24 extends to position the film unit laterally and longitudinally with respect to the film plane 26. The forward wall 27a bears against the underside of plate 26a to locate the forwardmost film unit vertically with respect to the film plane 26. Springs (not shown) on the bottom wall of portion 12a engage the back wall of cassette 24 and urge the cassette upwardly to locate top wall 27a in abutting relation with the underside of plate 26a.

The top roller 28 is adapted to be rotatably driven by a small DC electrical motor 35 mounted on the leading end of an inner frame member (not shown) within portion 12a, and coupled to roller 28 through an elongated gear train (not shown) that extends along the right side of base section 12 outboard of the film receiving chamber 22 and the pressure-applying rollers 28 and 29. A well or recess 36 is provided in the lower portion of housing section 14 for accommodating motor 35.

The major portion of the gear train extends rearwardly into portion 12a from the interface between portions 12a and 12b and has a roller drive pinion (not shown) at its leading end. The drive pinion is drivingly engaged with a larger gear (not shown) fixed to the right end of roller 28 when portion 12b is located in its closed operative position to impart rotary motion to roller 28. This larger gear becomes disengaged from the drive pinion and pivots downwardly with portion 12b when it is opened for loading a cassette 24 into chamber 22.

At the trailing end of the gear train is a film advancing mechanism or pick (not shown) that extends into a slot at the trailing right-hand end of the cassette 24 and engages the rear edge of the forwardmost film unit 25. The pick is advanced forwardly by a pick drive cam or pin on one of the gears in the train when it rotates in response to being driven by motor 35. The forward motion of the pick advances the forwardmost film unit 25 through the film withdrawal slot in the leading end of cassette 24 and feeds the leading end of the film unit 25 into the bite of the pressure-applying rollers 28 and 29.

Following exposure of the forwardmost film unit 25 through aperture 27, the motor 34 is energized, preferably by the flat battery in cassette 24, and the exposed film unit is advanced by the pick into engagement with the rollers 28 and 29. Roller 28 is rotated in a counterclockwise direction to advance the film unit 25 between the pressure-applying rollers and along a film exit path extending through the film exit opening 30 to the exterior of the camera 10.

The rollers 28 and 29 apply a compressive pressure to the film uit 25 as it is advanced therebetween for rupturing a pod at the leading end of the film unit and releasing therefrom an opaque fluid processing composition which is distributed between prdetermined layers of the film unit to initiate a well-known development and diffusion transfer process. In the illustrated embodiment, as film unit 25 is advanced through the exit opening 30, it engages and uncoils a light opaque retractable frog's tongue 37 that protectively covers the emerging film unit to block the passage of ambient light rearwardly along transparent layers of the film unit thereby protecting the photosensitive portion of the film unit behind the rollers, which has not yet been covered with the processing fluid, from being fogged.

The components and systems in base housing section 12 for supporting a film unit 25, supplied in cassette 24, at the camera's film plane 26 in position for exposure, and for processing and ejecting the film unit from the camera following exposure are all well-known in the prior art and need not be described further here to understand the present invention. Representative examples of such components and systems suitable for use in camera 10 are disclosed in commonly-assigned U.S. Pat. Nos. 3,714,879; 3,967,304; 4,047,192; and 4,051,492, all of which are incorporated by reference herein.

The lens and shutter housing 14 is pivotally coupled to the inner frame within base housing section portion 12a adjacent the leading end of the film plane 26, at pivot pins 38 on the opposite lateral side walls 39 of housing section 14, for movement between the erected exposure position of FIGS. 1, 2 and 4 wherein it stands upright with respect to base housing section 12 and the flat or folded storage position of FIGS. 3 and 5 wherein housing section 14 is folded back over housing section 12 so as to overlie at least a portion of the film plane 26.

As best shown in FIG. 1, housing section 14 mounts, on a forward wall 40 thereof, an adjustable focus objective or taking lens 42; a front negative viewfinder lens 44 which is configured to be located in optical alignment with a rear positive lens 46 on viewfinder lens assembly 20 when camera 10 is erected to define a Gallilean-type viewfinder for framing the scene in the field of view of objective lens 42; a camera cycle start button 48 that is manually actuable to initiate an automatic film exposure and processing cycle; a window 50 for transmitting scene light to a photocell within housing 14 forming part of the camera's automatic exposure control system; and an optional sonar transducer 52 forming part of an optional automatic ranging and lens focusing system.

Located behind lens 42 is an electronically controlled shutter (not shown) for automatically regulating the transmission of image forming light rays through lens 42 to the film plane.

Figure 6:
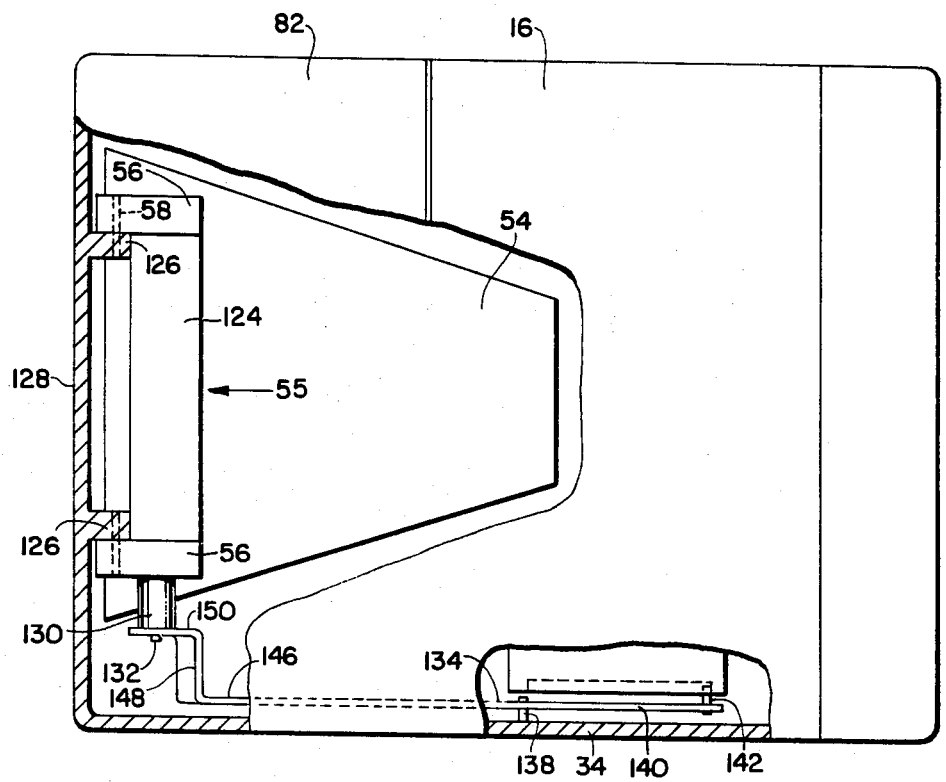
FIG. 6 is a plan view, partly cut away, of the camera embodying the present invention.

As best shown in FIGS. 4, 5 and 6, base housing section portion 12a also mounts a trapezoidal-shaped mirror 54 therein for reflecting image forming light rays from lens 42 onto a film unit 25 located at the exposure position. Mirror 54 is attached near its trailing or bottom end to a mirror support frame 55 having a pair of laterally spaced rearwardly extending arms 56 thereon that are pivotally coupled at pivot pins 58 in base housing section portion 12a adjacent the opposite or trailing end of the film plane 26 for movement between the erected inclined exposure position of FIG. 4 and the flat storage position of FIGS. 5 and 6. This mirror assembly is interconnected with lens and shutter housing section 14 by a linkage system 60, to be described later in detail, for mutual coordinated movement between their respective erected and folded positions.

When camera 10 is erected, the mirror 54 assumes an inclined exposure position over the film plane 26 with its front reflective surface 62 set at a predetermined angle with respect to the optic axis of lens 42 and a film plane 26 so that the reflected image forming light impinges the film plane at an angle that is normal thereto. In the illustrated embodiment, the erected housing section 14 is substantially perpendicular to the base section 12 so that the optic axis of lens 42 is parallel to the film plane 26, and the front surface 62 of the erected mirror 54 is set at an angle of 45° with respect to the optic axis and the film plane 26.

The mirror 54 serves two distinct purposes. First, it provides an additional image reversal in the exposure optical path so that the positive image in the final print has the correct orientation. It also serves to fold the optical path between lens 42 and the film plane 26 to make the erected camera more compact.

As will become apparent later, the mirror assembly is pivoted toward its folded position ahead of housing section 14 so that the folded mirror 54 overlies at least a portion of the film plane 26 and is located between the film plane 26 and a rear wall 64 of housing section 14 located in its folded position.

Figure 7:
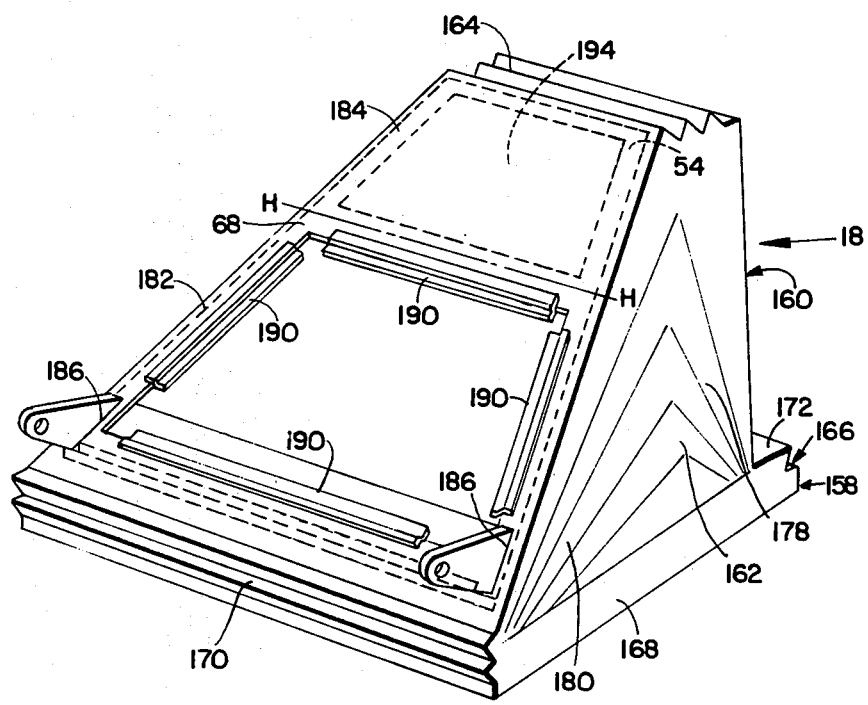
FIG. 7 is a perspective view of a folding bellows, forming part of said camera, shown in its erected position.

Coupled between the rear wall 64 of lens and shutter housing 14 and a peripheral section of the inner frame within base section portion 12a adjacent the film plane area is the flexible light opaque bellows 18 that is movable between the erected position of FIGS. 4 and 7 wherein it cooperates with base section portion 12a and housing section 14 to define a light excluding exposure chamber 66 surrounding the optical path from lens 42 to the film plane 26, and a folded storage position shown in FIG. 5 wherein bellows 18 is folded back on itself along a rear wall 68 thereof so that a portion of the folded bellows assumes a flat configuration located between the rear wall 64 of the folded housing section 14 and the backside of the folded mirror 54. As will become apparent later, when bellows 18 and linkage system 60 are described in more detail, camera 10 is constructed so that mirror 54 essentially is pivoted downwardly ahead of an upper portion of the bellows to clear a bellows folding path and permit the compact folded arrangement of the various components shown in FIG. 5.

Housing section 16 is a clam shell cover section pivotally coupled at its trailing end to a trailing end upstanding section 70 of base section portion 12a at hinge structure 72 for movement between the operative erected position of FIGS. 1, 2 and 4 and the inoperative folded storage position of FIGS. 3 and 5.

Mounted in a receiving well 74 formed in a leading end wall 76 of cover section 16 is a small compact electronic strobe lighting unit 78, best shown in FIG. 1, serving as a source of artificial illumination for flash photography when cover section 16 is at its erected position to position unit 78 above lens 42 so that its light output is directed toward the scene to be photographed.

In the illustrated embodiment, strobe unit 78 is integrated into an automatic exposure control system and preferably is of the variable output type which is automatically fired and quenched at appropriate times during the course of an exposure cycle to provide primary scene lighting or auxiliary light for fill flash exposures. The flash parameters for any given exposure are automatically selected in accordance with various preexposure inputs including ambient scene brightness level and camera-to-scene distance. Representative examples of automatic exposure control systems suitable for use in camera 10 may be found in commonly-assigned U.S. Pat. Nos. 4,074,288; and 4,188,103, and copending applications U.S. Ser. No. 262,501 filed on May 11, 1981 and Ser. No. 275,718 filed on June 22, 1981, now U.S. Pat. No. 4,354,748, all of which are incorporated by reference herein.

A longitudinally extending aperture or opening 80 is provided in the left rear corner portion of cover section 16 for accommodating the rear viewfinder lens assembly 20 and providing an optical transmission window between front and rear lenses 44 and 46. Assembly 20 comprises an elongated cap or cover 82 that is pivotally coupled at its opposite lateral sides to section 16 at pivot pins 84, adjacent the leading end of opening 80 and includes a forwardly extending finger 86 at the leading end thereof that extends into the interior of section 16 beyond the pivot pins 84; and the rear viewfinder lens element 46 fixed in a rectangular frame 88 having its bottom forward edge pivotally coupled to upstanding section 70 on base portion 12a at hinge 90 and a pair of outwardly extending guide pins 92 fixed at the upper sides of frames 88 and having their outboard ends captured in a pair of arcuate longitudinally extending guide and camming channels 94 formed on the interior of lateral side walls 96 of cover 82. A torsion spring 98 is wound about one of the cover pivot pins 84 and has one arm 100 thereof secured to cover 82 and the other arm 102 thereof secured to cover section 16 to provide a biasing force on cover 82 that urges it to rotate in a clockwise direction about pins 84.

As will become apparent later, assembly 20 is automatically erected to its operative viewing position shown in FIGS. 1, 2 and 4 in response to the manual movement of cover section 16 from its folded or closed position to its erected or open position and, likewise, is folded automatically to assume its storage position shown in FIGS. 3 and 5 when cover section 16 is closed.

Cover section 16 is connected near its forward right-hand end to the lens and shutter housing section 14 by means of an elongated erecting link 104. The upper or forward end of link 104 is pivotally coupled to the interior of cover section side wall 106 at pivot pin 108 thereon, and the lower end of link 104 is pivotally coupled to the right side wall 39 of housing section 14 at pivot pin 110, above and slightly forwardly of the lens and shutter housing pivot 38. A torsion spring 112 wrapped about pin 108 has one arm 114 thereof attached to side wall 106 and the other arm 116 thereof engaged with link 104 to provide a biasing force on link 104 that urges it to pivot in a counterclockwise direction (as viewed in FIGS. 4 and 5) about pin 108.

Base section portion 12a, cover section 16, link 104 and housing section 14 form a four bar linkage with the pivot centers of hinge structure 72 and pivot pins 38 being fixed centers. Cover section 16 is the driver link, housing section 14 is the follower link, and link 104 is the coupler or connecting rod. In this manner, cover section 16 and housing section 14 are connected in driver/follower relation for coordinated simultaneous movement between their respective erected and folded positions.

To open camera 10, the operator holds base section 12 in one hand and with the other hand grasps the leading ends of cover side walls 106 and lifts cover section 16 upwardly. This causes cover section 16 to pivot in a counterclockwise direction (as viewed in FIGS. 4 and 5) towards its erected position. Link 104 is driven upwardly in response to the motion of cover section 16 and applies a force to housing section 14 at pivot pin 110, located to the left of pivot pin 38 in FIG. 5, producing a clockwise moment or torque on section 14 that causes it to pivot in a clockwise direction about pivot 38 towards its erect position.

The rotational torque applied to housing section 14 continues as cover section 16 moves towards its open position until link 104 and housing section 14 are in a dead center relationship wherein pivots 108, 110 and 38 are linearly aligned along a common line of action extending therethrough. As noted earlier, torsion spring 112 provides a force on link 104 that biases it in a counterclockwise direction about pin 108. When the four bar linkage is at the dead center position it is static but unstable. That is, a rotational force on cover 16 produces a reaction force that is transmitted along the common line of action so that it does not produce any rotational force on either link 104 or housing section 14. However, if either link 104 or housing section 14 is subjected to even a small independently applied rotational force, the pivot 110 will move off the common line of action and the four bar linkage will once again operate in the driver/follower relationship.

In the illustrated embodiment, spring 112 serves as the independent force to pivot link 104 to an over center position. This counterclockwise pivoting motion of link 104 about pivot 108 rotates housing section 14 in the clockwise direction until the lower end of housing forward wall 40 abuts against a rear edge 118 of a top wall section 120 of base section portion 12b that encloses a plurality of electrical switches (not shown) for controlling the sequence of operation of various electrical subsystems. Edge 118 serves as a stop against which housing section 14 abuts to define its upright erected position. Because further clockwise rotation of housing section 14 is inhibited by stop 118, and pivot 110 is offset or beyond a line of action running between pivots 108 and 38, the four bar linkage is stabilized, thereby maintaining housing sections 14 and 16 in their respective erected positions.

To close camera 10, the operator pushes rearwardly on link 104 so it rotates in a clockwise direction about pivot 108 to move pivot 110 through the dead center position to a position on the opposite side of the line of action between pivots 108 and 38. Now, camera 10 may be closed by pivoting cover section 16 downwardly in a clockwise direction about hinge 72 towards its closed position. Through the action of the four bar linkage, housing section 14 is thereby pivoted in a counterclockwise direction about pivot 38 to its folded storage position.

As noted earlier, the mirror assembly, now designated assembly 122, comprises the trapezoidal-shaped mirror 54 and the mirror support frame 55. Support frames 55, as best shown in FIG. 6, includes a flat transverse base plate 124 secured to the backside of mirror 54, near the trailing end thereof, by any suitable means (e.g., adhesive bonding) and the pair of laterally spaced upstanding and rearwardly extending mounting arms 56 thereon. The arms 56 are pivotally connected by pins 58 to a pair of forwardly extending mirror mount supports 126 provided on the interior side of a trailing end wall 128 of base section portion 12a.

The right support arm 56 also includes an integrally formed outwardly extending transverse boss 130 carrying a fixed pin 132 on the outboard end thereof for connecting mirror assembly 122 to the previously-noted linkage system 60 which interconnects assembly 122 with lens and shutter housing 14 for coordinated simultaneous movement between their respective erected and folded positions.

Linkage system 60 comprises an elongated rocker link 134 extending along the right side of base section portion 12a between the left side wall 34 and the facing side of the film receiving chamber 22, and a link driving cam track 136 integrally formed in the bottom portion of the left side wall 39 of the lens and shutter housing 14.

Link 134 pivots, intermediate its opposite ends, about an inwardly extending pin 138 secured to the interior of left side wall 34 for movement between the erected position of FIG. 4 and the folded storage position of FIGS. 5 and 6. Extending forwardly of pin 138 is a forward link section 140 that carries, at its leading end, a fixed transverse pin 142 which extends into and rides along the cam track 136 thereby coupling link 134 to housing section 14. Extending rearwardly from pin 138 is an intermediate link section 144 that is inclined upwardly at a relatively shallow angle with respect to the horizontal forward section 140 (as viewed in FIG. 4), and a trailing end section 146 that is inclined upwardly at a steeper angle than section 144 and includes an inwardly offset portion 148 to position a terminal end 150 thereof adjacent boss 130 so that pin 132 extends through an inclined cam slot 152 to couple the rocker link 134 to mirror assembly 122.

The link driving cam track 136 includes a relatively short inclined mirror pivot section 154 followed by a longer arcuate dwell section 156. All points along dwell section 156 are at a constant radial distance from the pivot pin 38 so that when link pin 142 is riding in this section of track 136 the pin is not displaced with respect to pivot pin 38 or the link pivot pin 138 and there is no pivotal motion imparted to rocker link 134. On the other hand, points along mirror pivot section 154 vary in radial distance from pivot pin 38. This variation increases linearly from the transition zone between sections 154 and 156 to the terminal end of section 154. As pin 142 rides in section 154 in response to rotation of housing section 14, it is displaced vertically with respect to link pivot pin 138 thereby producing pivotal motion in link 134 to rotatably drive the mirror assembly 122.

As best shown in FIG. 5, when camera 10 is in the closed position, pin 142 sits at the terminal end of cam track dwell section 156 with rocker link 134 in its folded position. As camera 10 is opened, housing section 14 pivots in a clockwise manner about pivot 38 in response to the opening motion of cover section 16. Because dwell section 156 is at a constant radial distance from pivot 38, there is no displacement force applied to pin 142 and link 134 and mirror assembly 122 remain in their respective folded positions until housing section 14 is relatively close to its erected position. This allows housing section 14 to clear out of the path of travel of the mirror 54 before the mirror is erected.

In response to further clockwise rotation of housing section 14, pin 142 passes into cam track section 154 and is driven downwardly as it follows the downwardly inclined slope of this portion of the guide channel 136. As a result of this downward pressure on pin 142, link 134 pivots in a clockwise direction about pin 138 thereby lifting the trailing end of link 134 upwardly to apply an upward force on pin 132. This provides a counterclockwise moment on the mirror support frame 55 and it pivots about pin 58 to raise the mirror 54 to the erected position of FIG. 4. With housing section 14 maintained in its upright erected position wherein it is urged into abutment with edge 118 by the over center erecting link 104, the position of pin 142 is fixed in cam track portion 154 thereby fixing the position of link 134. In turn, this fixes the position of mirror 54 in that pin 132 is held at fixed position with the inclined slot 152.

As camera 10 is closed, the sequence of movement of the components is reversed. In response to initial rotation of housing section 14 from its erected position toward its folded position, pin 142 rides in the short track section 154 and is displaced upwardly. This pivots link 134 in a counterclockwise direction about pin 138 to drive mirror assembly 122 downwardly to its folded position. Thereafter, pin 142 enters the dwell section 156 and housing section 14 pivots downwardly without cam track 136 effecting any further displacement of the rocker link 134.

With this linkage system, the movement of mirror 54 and housing section 14 which have intersecting arcs of travel, are coordinated so that they do not interfere with each other while allowing them to be stacked in the interleafed arrangement to make camera 10 more compact in its longitudinal dimension. That is, as the camera is opened, housing section 14 is moved through a major portion of its arc of travel toward the erected position before rotational movement is imparted to mirror 54 to clear the housing section 14 out of the mirror's arc of travel. Upon closing the camera, the mirror 54 is moved through a major portion of its arc of travel during only slight rotational movement of housing section 14 away from its erected position to clear the mirror out of the path of travel of housing section 14. Movement of mirror 54 in this manner also clears it out of the folding path of the bellows 18.

There are two distinct functional aspects to bellows 18. The first relates to the photographic process wherein the erected bellows 18 cooperates with the lens and shutter housing 14 and the base section portion 12a to define the ambient light excluding exposure chamber 66 surrounding the exposure optical path between lens 42, mirror surface 62 and the film plane 26. The second relates to its design and structure for automatic movement between its erected and folded positions and, perhaps more importantly, to its integration into the camera folding scheme so that it may be folded into the flat storage configuration without conflict with the other movable camera components.

Bellows 18 preferably is formed of any suitable thin light opaque flexible sheet material such as rubber, vinyl or the like. As best shown in FIGS. 4 and 7, the erected bellows 18 includes a generally rectangular base or bottom peripheral section 158, a forward wall 160, the opposed rear wall 68, a pair of side walls 162 and an accordion pleated top wall 164.

The base section 158 comprises an accordion pleated leading end wall 166, a pair of oppositely spaced planar side walls 168, and a pleated trailing end wall 170. The vertical planar forward wall 160 is set back from the leading end wall 166 behind a short horizontal transverse wall 172 covering the top of the projecting leading end of base section 158.

The base section 158 is secured to the inner frame within portion 12a surrounding the film pack receiving chamber 22; the front wall 160 is secured to the rear wall 64 of housing section 14 and the short horizontal wall 172 is secured to a transverse horizontal bottom flange section 174 of housing section 14 intermediate side walls 39. A central recess or cutout (not shown) is provided in flange 174 and the front end of base section 158 to provide clearance for the motor 35 when camera 10 is folded. A central opening 176 is provided in bellows front wall 160, in registration with lens 42, through which image forming light rays are transmitted into the exposure chamber 66.

The side walls 162 incline inwardly as they extend upwardly from peripheral side walls 168 to the top wall 164. Thus, the upper end of the left bellow side walls 162 is inboard of the sight line between the viewfinder forward lens 44 and its rear lens 46 and does not interfere with the viewfinder optical path when the bellows is erected. Forward and rear pleats, as suggested in FIG. 7 at 178 and 180, are provided in side walls 162 to facilitate folding.

The erected bellows rear walls 68 extends upwardly from trailing end wall 170 to top wall 164 and is inclined at approximately 45° with respect to base section 158 to overlie the erected mirror 54.

In a preferred embodiment, a lower section 182 of rear wall 68, below a dotted hinge line H shown in FIG. 7, is adapted to be attached to the facing backside of mirror 54 while an upper section 184 of wall 68, above hinge line H, is not attached to the upper portion of mirror 54 to facilitate folding bellows 18, as will become apparent later.

In the illustrated embodiment, a pair of openings 186 are provided in the rear lateral corners of lower wall section 182 through which the mirror pivot arms 56 extend. The lower section 182 is securely attached to the lower back side of the mirror assembly 122 by means of four (4) L-shaped compression clips 190, three of which are attached to the back side of mirror 54 and one to mirror support frame base plate 124, that extend through a large opening 192 in lower section 182 and engage the edge portions of section 182 surrounding opening 192. Clips 190 urge the bellows material into intimate contact with the back side of the mirror assembly to provide a light tight seal therebetween. In an alternative embodiment, the clips 190 and opening 192 may be eliminated and section 182 may be attached to the lower portion of the mirror assembly by adhesive bonding.

Above the hinge line H, upper section 184 is preferably stiffened to facilitate its pivotal motion about hinge line H when the bellows 18 is moved between its erected and folded positions. In the illustrated embodiment, this is accomplished by providing a stiffening panel 194 on the interior side of section 184. Panel 194 may be formed of cardboard or a stiff plastic material and is secured to the interior surface of section 84 by any suitable method such as adhesive bonding.

As best shown in FIG. 4, when bellows 18 is erected the unattached stiffened section 184 of rear wall 68 overlies the upper free end of mirror 54 with the accordion pleated top wall 164 bridging the gap between the top of the mirror and the rear wall 64 of housing section 14. The pleats are provided in top wall 164 and the end walls 166 and 170 to allow those sections to stretch and contract as the bellows is manipulated to facilitate the folding action and also to accommodate the pivotal movement of components adjacent thereto.

As noted earlier, when the camera is folded, initial counterclockwise rotation of housing section 14 actuates the linkage system 60 causing mirror assembly 122 to pivot down rapidly in a clockwise direction about pivot pins 58 to the folded position of FIG. 5. In response to this motion, the rear portion of the side walls 162 fold along pleats 180 and the attached section 182 of rear wall 68, below hinge line H, is driven downwardly by the mirror assembly through its connection thereto via clips 190. However, the unattached stiffened upper section 184, having its leading end in effect attached to the upper end of housing section 14 by the connecting top wall 164 does not follow the upper end of mirror 54 but rather is constrained by the top wall 164 which is now elongated to accommodate the increased distance between the hinge line H and the point of attachment of top wall 164 to the upper end of housing section 14. Due to the movement of mirror assembly 122 to its folded position, the upper section 184 of bellows 18 in effect is pivoted in a counterclockwise direction about the hinge line H, away from the upper back side of mirror 54 so that it lies in a plane, along with the extended top wall 164, extending between hinge line H and the upper end of the rear wall 64 of housing section 14.

Now, as housing section 14 continues to pivot downwardly towards its closed position, the forward ends of belows side walls 162 fold along the pleats 178, and the stiffened section 184 and the top wall 164 continue to pivot in a counterclockwise direction about the hinge line H. During this rotation, the stiffened section 184 passes through the over center position (i.e. where it is perpendicular to the plane of mirror 54) and continues downwardly until it is folded back over the lower section 182 in substantially parallel overlying relation thereto with the top wall 164 overlying it in a common plane with bellows front wall 160. Thus, the lower section 182, the stiffened section 184 and the extended top wall 164 assume a Z-fold configuration for flat storage with portions thereof disposed between housing section 14 and mirror 54, overlying the film plane 26.

The pleated rear wall 170 compresses to accommodate the rotational movement of the mirror support frame 55 and the leading end peripheral wall 166 elongates to accommodate the upward displacement of the bottom portion of housing section 14 when it pivots to its folded position.

Upon erecting camera 10, initial clockwise rotation of housing section 14 lifts the top wall 164. This upward motion of top wall 164 causes it to pivot the folded section 184 in a clockwise manner about the hinge line H so that it passes over center and once again is aligned with top wall 164. Now, in response to the action of linkage system 60, the mirror assembly 122 is pivoted upwardly in a counterclockwise direction about pins 58 to erect mirror 54 and the lower section 182 of bellows rear wall 68. This releases the tension in top wall 164 and it contracts to bring the upper stiffened section 184 once again into overlying relation with the upper end of the erected mirror 54.

If one visualizes the individual and collective folding paths of travel of rear wall sections 182 and 184 and top wall 164, it becomes apparent that at least sections 182 and 184 must move through the plane formerly occupied by the erected mirror 54. In order for these bellows sections to assume the flat Z-folded configuration of FIG. 5, mirror 54 must be moved out of the collective folding path ahead of the folding action. Thus, in addition to coordinating the movement of the mirror assembly 122 with housing section 14, the linkage system 60 also coordinates the movement of assembly 122 with the folding action of bellows 18 by moving assembly 122 downwardly towards the film plane 26 ahead of bellows sections 182 and 184 to provide the necessary clearance for the bellows folding motion. Conversely, as the camera is opened, erection of the mirror 54 is delayed so that the bellows sections may move through the erected mirror position as they unfold before mirror 54 is moved into its erected exposure position.

By means of the above-described coordinated movement of the bellows 18, mirror assembly 122 and the lens and shutter housing 14, these components assume a compact folded configuration arranged in stacked relation over the film plane area 26 where the photosensitive image forming area of the forwardmost film unit 25 is to be located in position for exposure. Once arranged in this stacked relation, these components are covered and protected by the closed cover section 16 as best shown in FIG. 3.

As noted earlier, the rear viewfinder lens assembly 20 is configured to be self-erecting and folding in response to respectively opening and closing camera 10.

The elongated cover 82 is pivotally connected to cover section 16 at pivot pins 84 and torsion spring 98 provides a clockwise (as viewed in FIGS. 4 and 5) or opening biasing force on cover 82 for continuously urging it toward the erected position.

When cover section 16 is in its erected position, the clockwise biasing force on cover 82 and the camming action of guide tracks 94 maintain the pins 92 at the left terminal ends of the guide tracks 94 to hold frame 88 in its upright erected position, substantially perpendicular to cover 82, wherein rear lens 46 is in optical alignment with the front lens 44 to form the camera's viewfinder having a viewing path that ends through aperture 80.

As cover section 16 is closed manually, after releasing erecting link 104, frame 88 and cover 82 initially maintain their perpendicular relationship and rotate downwardly together with frame 88 pivoting in a clockwise direction about hinge 90 and cover 82 following its point of attachment to cover section 16 at pins 84. The downward motion of cover section 16 causes link 104 to rotate housing section 14 downwardly toward its folded position and the upper end of its forward wall 40 moves into a position beneath the decending finger 86 of cover 82 projecting forwardly into cover section 16. When the lens and shutter housing section 14 reaches its folded position of FIG. 5, the cover section 16 is still raised a bit relative to housing section 12 and the tip of finger 86 is in engagement with forward wall 40. Cover section 82 is in effect a lever having its fulcrum at pins 84 with its right-hand end (tip of finger 86) prevented from moving further downwardly by its engagement with the forward wall 40 of housing section 14. Thus, in response to the operator pushing downwardly on cover section 16 to move it to its folded position, the fulcrum 84 is driven downwardly causing cover 82 to pivot in a counterclockwise direction about pivot pins 84 to its folded position within aperture 80. In response to this downward movement, the pins 92 on frame 88 slide forwardly in the arcuate guide tracks 94 as a result of the camming action of tracks 94 on pins 92 thereby causing the frame 88 to pivot downwardly to its horizontal folded position between the side walls 96 of cover 82. The finger 86 remains in engagement with the forward wall 40 of housing section 14 thereby counteracting the influence of spring 98 to maintain cover 82 in the folded position wherein it is substantially flush with the portions of cover section 16 around aperture 80.

When camera 10 is open, the upward motion of cover section 16 results in the finger 86 becoming disengaged from the forward wall 40 of housing section 14 whereupon the biasing force of spring 98 rotates cover 82 in a clockwise direction about pins 84. This motion of cover 82 relative to cover section 16 causes the pins 92 to be cammed to the left terminal ends of tracks 94 to pivot the lens holding frame 88 into perpendicular relationship with cover 82. When cover section 16 reaches its erected position, it locates the lens frame 88 and cover 82 in the operative erected position of FIG. 4 and at least partially shades that portion of the viewing optical path thereunder.

It should be noted that the lens housing 14 mounting the viewfinder front lens 44 and the frame 88 holding the rear lens 46 are both mounted on a common structure, base housing section 12, to facilitate the alignment of these two optical elements during the manufacturing processes unlike the camera disclosed in the previously-noted U.S. Pat. No. 4,166,682 wherein the lack of a common mounting structure makes alignment more difficult and costly in terms of manufacturing tolerances.

Since certain changes may be made in the above-described folding camera without departing from the scope of the invention herein involved, it is intended that all matter contained in the above description or shown in the accompanying drawings shall be interpreted as illustrative and not in a limiting sense.

What is claimed is:

1. A folding camera including a self-erecting and folding viewfinder, said camera comprising:

a base housing section including means for supporting a film unit at a film plane within said base section;

a lens housing section mounting an objective lens and a front viewfinder lens, said lens housing section being pivotally coupled to said base section adjacent one end thereof for movement between an upstanding operative erected position and a folded storage position wherein it is folded back over said base housing section in overlying relation to at least a portion of said film plane;

a mirror assembly including a mirror pivotally coupled to said base section, adjacent an opposite end thereof, for movement between an operative erected position for reflecting image-forming light rays from said lens onto said film plane to expose a film unit thereat and a folded storage position overlying at least a portion of said film plane;

a foldable bellows coupled to said base and lens housing sections and said mirror assembly for movement between an erected position for light shielding the exposure optical path extending between said objective lens, mirror and film plane, and a flat storage position wherein at least a portion of said bellows overlies said film plane;

a cover housing section, having an aperture therein, pivotally coupled to said base section adjacent said opposite end thereof for movement between an erected position providing clearance for said lens housing, mirror assembly and bellows to assume their respective erected positions and a folded storage position overlying said base section and protectively covering said folded lens housing section, mirror assembly and bellows;

first erecting means interconnecting said lens and cover housing sections for coordinated movement between their respective erected and storage positions;

second erecting means interconnecting said lens housing section and said mirror assembly for coordinated movement between their respective erected and storage positions;

a rear viewfinder lens pivotally mounted on said base housing section for movement between an upstanding operative erected position, wherein said rear lens is in optical alignment with said erected front lens to form a viewfinder having a viewing path that extends through said aperture in said erected cover section for viewing and framing a scene in the field of view of said objective lens, and a folded storage position wherein said rear viewfinder lens is folded down in overlying relation to said base housing section; and third erecting means responsive to movement of said cover housing section from its said storage position to its said erected position for effecting movement of said rear viewfinder lens from its said storage position to its said erected position and also responsive to movement of said cover section from its said erected position to its said storage position for effecting movement of said rear viewfinder lens from its said erected position to its said storage position.

2. The camera of claim 1 wherein said third erecting means includes a lever pivotally coupled to said cover housing section and connected in driving relation to said rear lens for moving said rear lens from its said storage position to its said erected position in response to pivoting said lever to an erected position with respect to said cover housing section and moving said cover housing section to its said erected position, and for moving said rear lens from its said erected position to its said storage position in response to moving said cover housing section to its said storage position and pivoting said lever to a storage position with respect to said cover housing section.

3. The camera of claim 2 wherein said third erecting means includes means for automatically effecting such pivotal motion of said lever in response to movement of said cover housing section between its said erected and storage positions.

4. The camera of claim 3 wherein said means for automatically effecting such pivotal motion of said lever includes means for spring biasing said lever towards its said erected position with respect to said cover housing section and a portion of said lever configured to engage a component of said camera, other than said cover housing section, in response to moving said cover housing section to its said storage position to impart a rotational force to said lever sufficient to overcome the force of said biasing means and move said lever to its said storage position relative to said cover housing section, said lever portion also being configured to become disengaged from said other component in response to moving said cover housing section toward its said erected position thereby releasing said lever for pivotal motion to its said erected position under the influence of said biasing means.

5. The camera of claim 4 wherein said other camera component includes said lens housing section located in its said storage position.

6. The camera of claim 4 wherein said lever also serves as a rear lens cover for at least partially shading that portion of said viewing optical path between said cover housing section and said rear viewfinder lens when said camera is erected and for protectively covering said rear viewfinder lens when said camera is folded.

7. The camera of claim 6 wherein said rear lens cover is substantially flush with adjacent portions of said cover housing section when said camera is in its said folded storage position.

* * * * *